US008171091B1

(12) United States Patent
Prakash

(10) Patent No.: US 8,171,091 B1
(45) Date of Patent: *May 1, 2012

(54) SYSTEMS AND METHODS FOR FILTERING CONTENTS OF A PUBLICATION

(75) Inventor: Vipul Ved Prakash, San Francisco, CA (US)

(73) Assignee: Cloudmark, Inc., San Francisco, CA (US)

( * ) Notice: Subject to any disclaimer, the term of this patent is extended or adjusted under 35 U.S.C. 154(b) by 116 days.

This patent is subject to a terminal disclaimer.

(21) Appl. No.: 12/470,795

(22) Filed: May 22, 2009

Related U.S. Application Data

(63) Continuation of application No. 10/663,204, filed on Sep. 15, 2003, now Pat. No. 7,539,729.

(51) Int. Cl.
*G06F 15/16* (2006.01)
(52) U.S. Cl. ......... 709/206; 709/204; 709/205; 709/207
(58) Field of Classification Search ........... 709/204–207
See application file for complete search history.

(56) References Cited

U.S. PATENT DOCUMENTS

| | | | |
|---|---|---|---|
| 5,765,152 A | 6/1998 | Erickson | |
| 5,919,258 A | 7/1999 | Kayashima et al. | |
| 6,021,443 A | 2/2000 | Bracho et al. | |
| 6,047,310 A | 4/2000 | Kamakura et al. | |
| 6,266,692 B1 | 7/2001 | Greenstein | |
| 6,314,425 B1 | 11/2001 | Serbinis et al. | |
| 6,515,765 B1 | 2/2003 | Umebayashi | |
| 6,584,466 B1 | 6/2003 | Serbinis et al. | |
| 6,615,242 B1 | 9/2003 | Riemers | |
| 6,631,400 B1 * | 10/2003 | DiStefano, III | 709/206 |
| 6,957,259 B1 | 10/2005 | Malik | |
| 7,047,241 B1 | 5/2006 | Erickson | |
| 7,149,778 B1 | 12/2006 | Patel et al. | |
| 7,539,729 B1 | 5/2009 | Prakash | |
| 2001/0010050 A1 | 7/2001 | Sakata | |
| 2002/0040374 A1 | 4/2002 | Kent | |
| 2002/0062368 A1 | 5/2002 | Holtzman et al. | |
| 2002/0165912 A1 | 11/2002 | Wenocur et al. | |
| 2002/0188689 A1 | 12/2002 | Chung | |
| 2003/0126218 A1 | 7/2003 | Sakonsaku | |
| 2003/0191696 A1 | 10/2003 | Yamamoto et al. | |
| 2003/0212745 A1 | 11/2003 | Caughey | |
| 2003/0220978 A1 | 11/2003 | Rhodes | |

(Continued)

OTHER PUBLICATIONS

"U.S. Appl. No. 10/663,204, Non-Final Office ACtion mailed Apr. 21, 2008", 13.

(Continued)

*Primary Examiner* — Hieu Hoang
(74) *Attorney, Agent, or Firm* — Cooley LLP

(57) ABSTRACT

A server is communicatively coupled to a content publisher and a client machine The server may register the publication by assigning a publication identification (ID) to the publication, and register the content by associating the content with the publication using the publication ID. In some example embodiments, the client machine may submit a request to the server to determine whether the content is associated with the publication. In some example embodiments, the server may provide the publication ID to the client based on the content being associated with the publication, and the publication ID may allow the client to determine whether the publication is on a subscribed list that is stored on the client machine. An example client machine may be configured to perform an action on the content, based on the user being subscribed to the publication.

8 Claims, 5 Drawing Sheets

U.S. PATENT DOCUMENTS

| | | |
|---|---|---|
| 2003/0233418 A1 | 12/2003 | Goldman |
| 2004/0049546 A1 | 3/2004 | Yoshida |
| 2004/0054741 A1 | 3/2004 | Weatherby et al. |
| 2004/0054779 A1* | 3/2004 | Takeshima et al. ........... 709/225 |
| 2004/0177120 A1 | 9/2004 | Kirsch |
| 2005/0015448 A1 | 1/2005 | Smith et al. |
| 2005/0015455 A1 | 1/2005 | Liu |
| 2005/0033810 A1 | 2/2005 | Malcolm |
| 2006/0010209 A1 | 1/2006 | Hodgson |
| 2006/0031298 A1* | 2/2006 | Hasegawa ..................... 709/206 |
| 2006/0041505 A1 | 2/2006 | Enyart |
| 2007/0005970 A1 | 1/2007 | Trupp et al. |

OTHER PUBLICATIONS

"U.S. Appl. No. 10/663,204 Notice of Allowance mailed Jan. 12, 2009", 4 pgs.

"U.S. Appl. No. 10/663,204 Response filed Oct. 21, 2008 to Non-Final Office Action mailed Apr. 21, 2008", 13 pages.

* cited by examiner

SYSTEMS AND METHODS FOR FILTERING CONTENTS OF A PUBLICATION

CLAIM OF PRIORITY

This application is a continuation of and hereby claims the benefit of U.S. patent application Ser. No. 10/663,204, entitled "A method and Apparatus to Enable Mass Message Publications to Reach a Client Equipped with a Filter," which was filed Sep. 15, 2003 and issued as U.S. Pat. No. 7,539,729, which is hereby incorporated by reference in its entirety.

FIELD

The subject matter of this application relates to bulk unsolicited electronic messages, in one embodiment, known as spam. In particular, the subject matter relates to systems and methods for preventing spam from reaching a mail folder of an email client.

BACKGROUND

One form of electronic communication includes electronic mail ("email"), which allows people to communicate with each other almost instantaneously, which in itself gives email a considerable advantage over conventional mail (also known as snail mail). However, email has several other advantages over snail mail, including the ability to send graphics, images, sound files, text, etc., within a single document. The term "email" as used herein is to be interpreted broadly to include any type of electronic message including voicemail messages, short message service (SMS) messages, multi-media messaging service (MMS) messages, facsimile messages, and other forms of communication. The above-mentioned advantages have resulted in email becoming almost ubiquitous in its popularity.

Concomitant with this rise in the popularity of this mail over snail mail, has been the rise in the number of bulk unsolicited email messages (also known as spam). Spam detracts somewhat from on the advantages of email in that it is annoying to receive and can lead to a reduction in productivity.

The growth in spam has spawned a whole generation of anti-spam software that essentially seeks to filter out spam before it is delivered to the inbox of an email client. Generally, anti-spam software makes use of anti-spam filters that filter email based on the content of the email. For example, certain words and phrases such as "making money," are known to be commonly used by spammers (the people who send spam) so that a filter can be designed to filter out email that use these words and phrases.

However, sometimes an email publication such as an email newsletter to which an email user is subscribed may end up being erroneously blocked as though it was spam because to a spam filter the email publication has attributes that make it resemble spam, e.g., the email newsletter may contain words commonly used by spammers.

DETAILED DESCRIPTION

Figure 1:
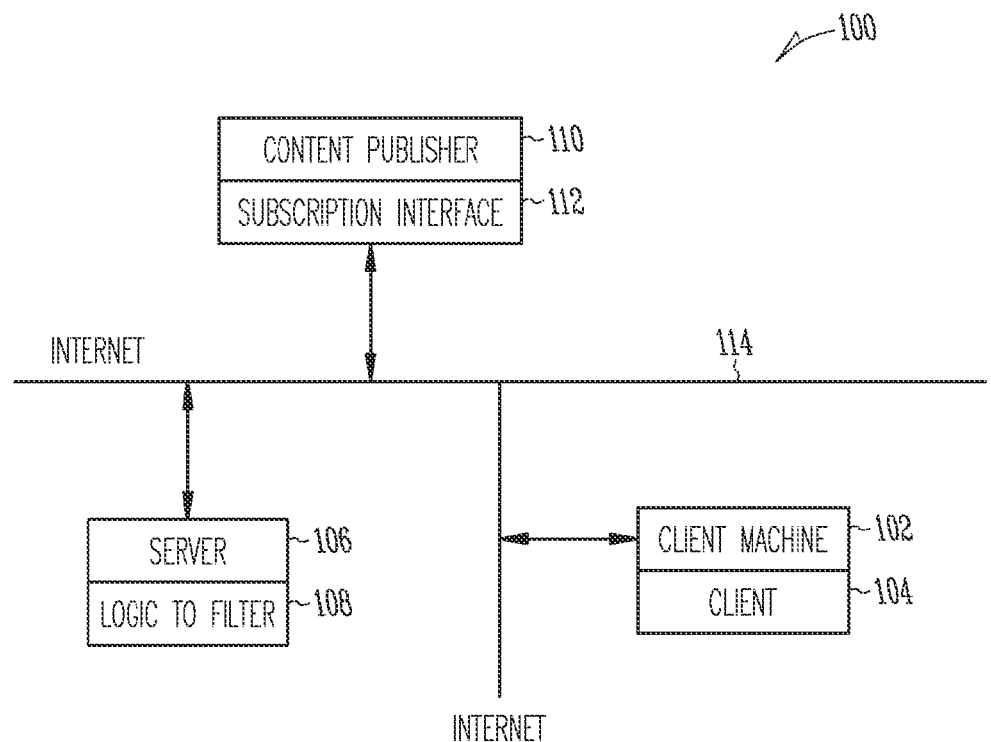
FIG. 1 shows an architecture within which embodiments of the present invention may be practices.

In one embodiment, the present invention discloses a technique in which a client makes use of a remote server to determine if an electronic message or communication has been registered. If the message has been registered then the message is delivered to an inbox of the client, otherwise appropriate action may be taken including deleting the message or placing it in a folder that contains only filtered messages. In another embodiment, the client maintains a subscribed list and an unsubscribed list. A user of the client has the ability to toggle messages between the subscribed and unsubscribed lists. In one embodiment, after it is determined that a message is registered then a further check is performed to determine if the message appears on the unsubscribed list. If the message appears on the unsubscribed list then it is not delivered to the inbox and may, in some embodiments, be automatically deleted. If the message appears on the subscribed list then the message is placed in the inbox. Thus, embodiments of the present invention afford a user the ability to manage subscriptions to selected electronic publications and messages. For example, the user is able to manage subscriptions to email distribution lists or publications. Other advantages of the present invention will become apparent from the following description.

In some example embodiments, the client machine may maintain a subscribed list and an unsubscribed list that provide those publications to which a client may or may not be subscribed. A user of the client machine may have the ability to toggle messages between the subscribed and unsubscribed lists. In an embodiment, after it is determined that a message is registered then a further check is performed to determine if the message appears on the unsubscribed list. If the message appears on the unsubscribed list then an action may be performed on the message such as automatically delivering the message to a folder or automatically deleting the message. If the message appears on the subscribed list then an action may be performed on the publication such as placing the message in an inbox or other folder. Thus, embodiments of the claimed subject matter afford a user the ability to manage subscriptions to selected electronic publications and messages.

In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in this specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Although the present invention has been described with reference to specific exemplary embodiments, it will be evident that the various modification and changes can be made to these embodiments without departing from the broader spirit of the invention as set forth in the claims. Accordingly, the specification and drawings are to be regarded in an illustrative sense rather than in a restrictive sense.

FIG. 1 of the drawings shows a high level system architecture 100 within embodiments of the present invention may be practiced. The architecture 100 includes a client machine 102 which is connected to a wide-area network 114, which in some embodiments may include the internet. The client machine 102 may be any electronic device capable of sending and receiving messages. For example, the client machine 102 may be a mobile telephone, or Personal Digital Assistant (PDA), a Pocket PC, a 2-way pager, etc. The client machine 102 also includes a client 104 which allows a user of the client machine 102 to send and receive messages. The invention as described herein would apply to wired as well as wireless forms of transmitting messages.

The architecture 100 also includes a server 106 which is connected to the wide-area network 114. In some embodiments, the server 106 may be a server such as is described in U.S. Pat. No. 7,373,385, which is hereby incorporated by reference. The server 106 also includes logic to filter software 108 which will be described in greater detail with reference to FIG. 2 of the drawings. In one embodiment, the logic to filter would include antispam software 108. Reference numeral 110 indicates a content publisher which includes any entity that publishes subscription-based publications. An example of a subscription-based publication includes an email distribution list. As will be seen, the content publisher 110 includes a subscription interface 112 which is connected to the wide-area network 114. The purpose of the subscription interface 112 is to manage subscriptions to the publications and messages published by the content publisher 110.

Figure 2:
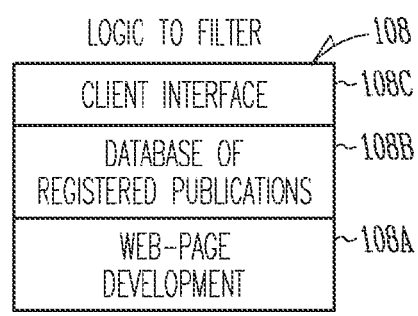
FIG. 2 shows a functional block diagram of software in accordance with one embodiment of the invention.

FIG. 2 of the drawings shows a high-level functional block diagram of components of the logic to filter 108 that are of relevance for purposes of this description. Referring to FIG. 2, it will be seen that the logic to filter 108 includes a content publisher registration module 108A. The module 108A enables the content publisher 110 to register a publication or message with the server 106 as will be described below. The logic to filter 108 also includes a database of registered publications 108B and a client interface 108C that interfaces with the client machine 102 as will be described.

Figure 3:
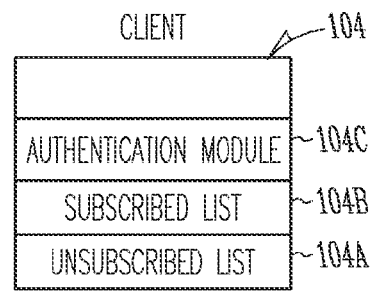
FIG. 3 shows a high level functional block diagram of a client in accordance with one embodiment of the invention.

Referring to FIG. 3 of the drawings, a high-level functional block diagram showing the functional components of the client 104 is shown. As will be seen, the client 104 includes an unsubscribed list 104A and a subscribed list 104B, as well as an authentication module 104C. The function of each of these components will become apparent from the description below.

Figure 4:
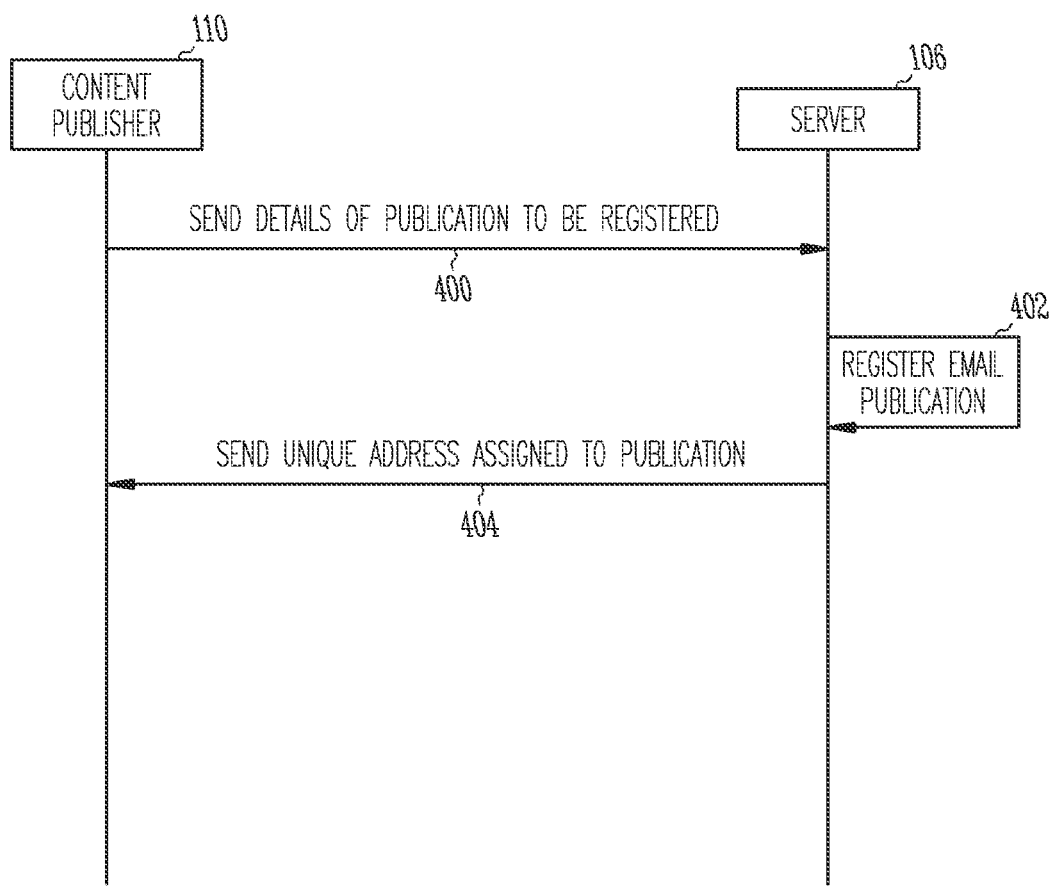
FIGS. 4-6 illustrates methods in accordance with embodiments of the present invention.

Referring to FIG. 4 of the drawings, operations performed by the content publisher 110, and the server 106, in accordance with one embodiment, in order to register a publication is shown. Referring to FIG. 4, at 400 the content publisher 110 sends details of the publication to be registered to the server 106. The details are sent over the wide-area network. Thereafter at 402, the server 106 registers the publication. The particular operations performed in registering the publication include, in some embodiments, assigning a random and unique address to the content publisher for the publication and assigning an identification number (ID) to the publication. The unique address, the assigned ID and the name of the publication are then stored in the database 104B of registered publications (see FIG. 2). At 404, the server 106 sends the unique address assigned to the publication to the content publisher 110. The content publisher 110 places the unique assigned address at the top of a distribution list for the publication. After completion of operations 400, 402, and 404, the publication is registered.

Figure 5:
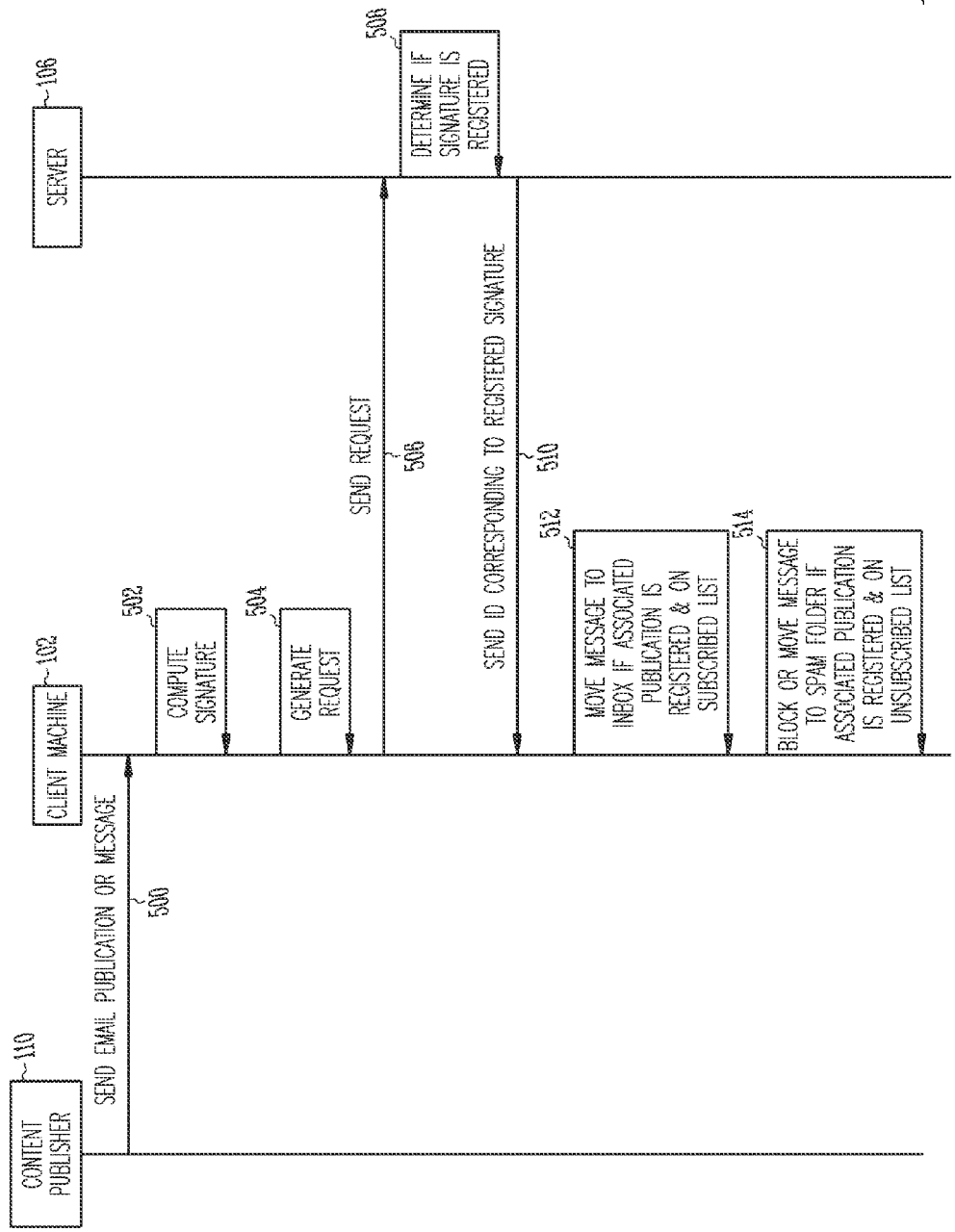

Referring to FIG. 5 of the drawings, an interaction between the content publisher 110, the client machine 102, and the server 106, in accordance with one embodiment, is shown. As will be seen, at 500, the content publisher 110 sends content associated with a publication in the form of a message to the client machine 102, over the wide-area network 114. The message is also automatically sent to the server 106 since the unique assigned address is at the head of the distribution list for the publication. The server 106 accesses the publication or message and computes a signature therefore, which signature is then associated with the ID for the publication. This process is called "content registration."

In one embodiment, during the above-described content registration process, there is an authentication of the content publisher 110. This authentication of the content publisher 110 may occur because the unique address assigned to the publication is both random and unique. Therefore, the content publisher 110 has knowledge of the unique random email address. Thus, when the publication is sent to the unique random address, the server 106 can treat all incoming messages to the unique assigned address as belonging to a previously registered publication.

Using a random and unique address for purpose of registration is motivated by ease of use. The content publisher 110 does not have to modify its existing infrastructure to participate in the publication registration and content registration processes described above. However, it is to be appreciated that in some embodiments, instead of using the implied authentication mechanism described above, an explicit authentication of the content publisher 110 and the publication or message sent by the content publisher 110 may be performed. For example, in one embodiment, public key cryptographic based methods may be used. In such a case, the content publisher 110 will provide a public key associated with a secret key which will then be used to digitally sign messages for content registration.

At 502, the client machine 102 receives a message associated with a publication and computes a signature of the content of the message. At block 504, the client generates a request to determine if the message has been registered at the server 106. The request 504 includes a signature computed at 502. In one embodiment, the signature may be a one-way hash of the content of the publication or message or some other derivative of the content of the message. At 506, the client 104 sends the request to the server 106. The request is received by the logic to filter 108 of the server 106 which then determines at 508, if the signature is registered. This determination involves using the signature as a key to search the database of registered messages to determine if the signature has been previously registered and associated with a registered publication in database 108B. If the signature has been registered then the ID assigned to the signature is retrieved and sent to the client 104 at 510. If the logic to filter 108 determines that the signature has not been registered then at 510 an appropriate message is sent to the client 104 to notify the client that the signature has not been registered. In some embodiments, the client may be configured to classify a registered message as legitimate, and to classify non-registered messages by a process of default classification which is described below.

Figure 6:
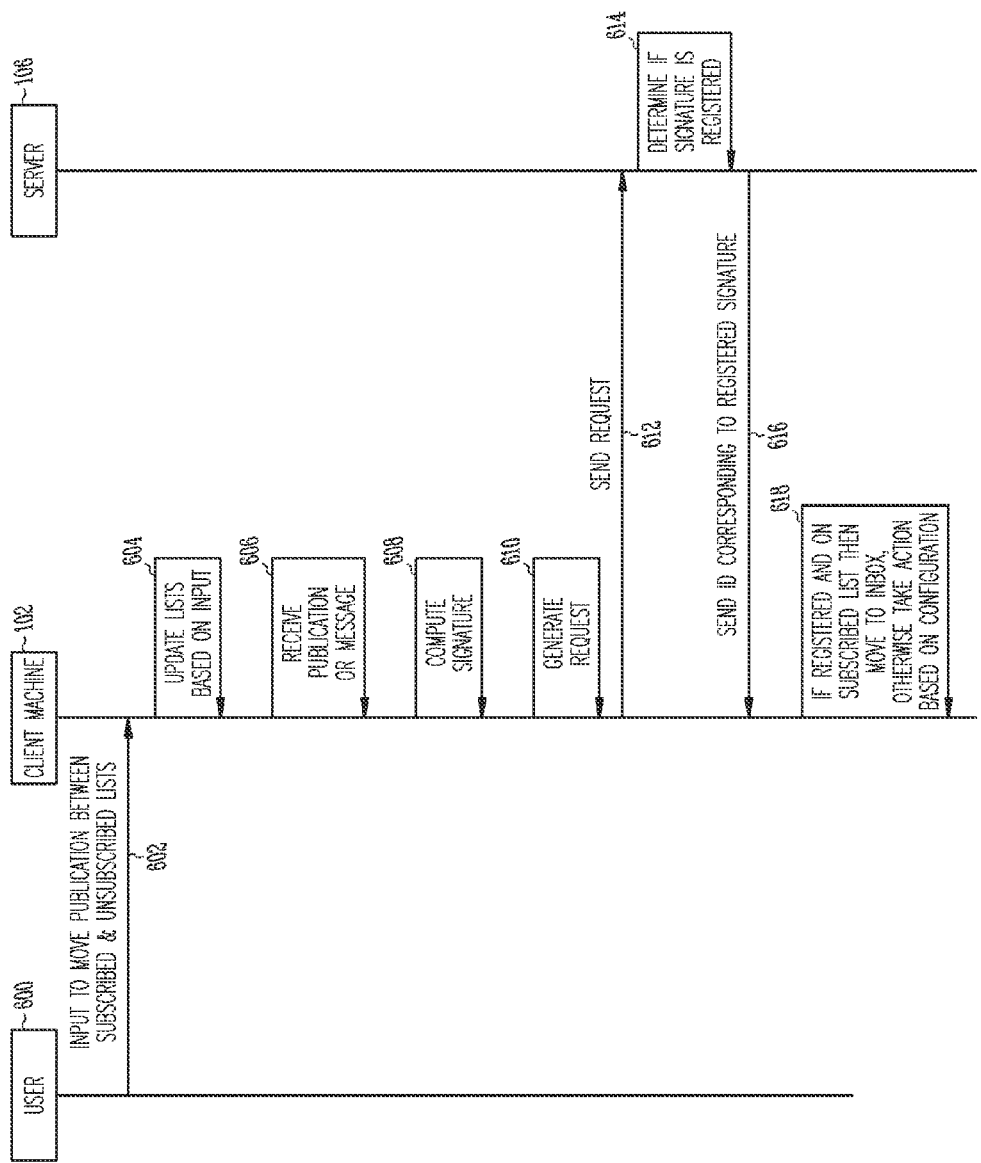

Referring to FIG. 6 of the drawings, an interaction between a user 600, the client machine 102, and the server 106, in accordance with one embodiment of the invention, is shown. At 602, the user 600 provides input to move a publication between the subscribed and unsubscribed lists 104B, and 104A, respectively. For example, in one embodiment, the client 104 provides a user interface (UI) that includes a "block" and "unblock" button. By selecting the block and unblock buttons, the user 600 may selectively indicate to the client 104 that a publication needs to be placed on the subscribed or unsubscribed lists 104B, and 104A, respectively. In response to receiving the input, at 604, the client 104 updates the subscribed and unsubscribed lists based on the input. At 606, the client 104 receives a message from the content publisher 110. Thereafter operations 608, 610, 612, 614, and 616, are performed which correspond substantially to the operations 502, 504, 506, 508, and 510 shown in FIG. 5 of the drawings. Thus, the operations 608 through 616 are therefore not further described.

At 618, the client 104 moves the message into the inbox if the message was registered at the server 106 and the associated publication appears in the subscribed list 104B. If the message is registered with the server 106 and the associated publication appears on the unsubscribed list 104A, then an action is performed based on a configuration of the client 104. For example, the client 104 may be configured to delete the message if it is registered and appears on the unsubscribed list. Alternatively, the client 104 may be configured to place the message in a folder if the message is registered at the server 106 and appears on the unsubscribed list 104A.

In one embodiment, the server 106 computes a rating. The rating provides an indication of the number of users who have indicated that the message, and consequently the publication, is unwanted (e.g., spam) using the system described in U.S. Pat. No. 7,373,385 issued May 13, 2008. In one embodiment, the rating is available through a dynamic web service for display on the content publisher's website. In some cases, the rating allows the client 104 to determine a default characterization of a message in the case of a user who has not made an explicit decision on whether or not the user wishes to receive the publication. More detail on how the client 104 uses a rating to determine the default characterization is provided below. In one embodiment, the rating is referred to as a spamminess rating. In alterative embodiments, the rating may be based on alternative attributes, without departing from the scope of the invention.

In one embodiment, the server 106 determines a popularity rating of all registered messages. The popularity rating is calculated on the basis of how many users query a server for an indication of whether a message is unwanted (e.g., spam). The popularity rating is sent by the server 106 to the content publisher 110, who may then publish the popularity rating on the associated website.

It will be appreciated that if a message is received for the first time there will be no entry corresponding to message in either the subscribed list 104B or the unsubscribed list 104A. In this case, the client 104 may determine a default characterization for the publication or message. The default characterization may be based on the above described rating, popularity rating, or some other rule. For example, in one embodiment, if the rating is high, the client 104 will by default characterize the or message as unwanted. Alternatively, if the rating is low, then the client 104 may automatically will by default characterize the message as legitimate. The values for a high rating and a low rating may be user configured.

Figure 7:
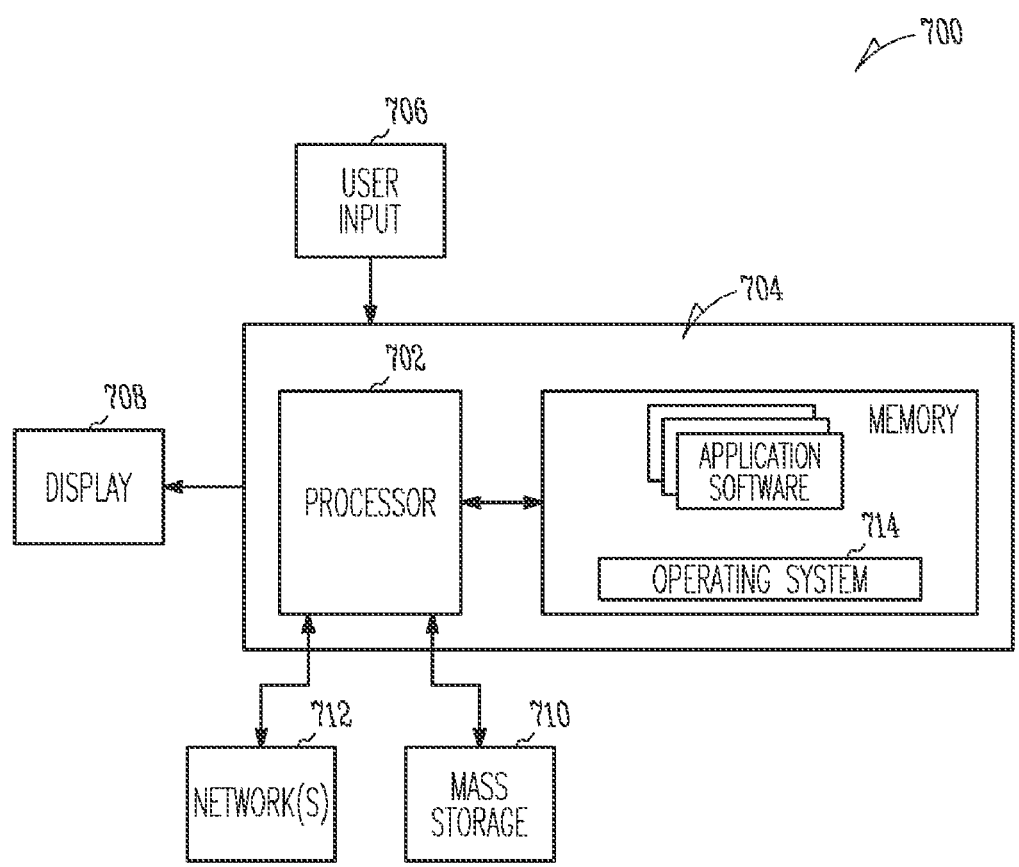
FIG. 7 shows a high-level block diagram of hardware that may be used to implement the methods of the present invention.

Referring to FIG. 7 of the drawings, reference numeral 700 generally indicates hardware that may be used to implement the server 106, the client machine 102, or the content publisher 110, in accordance with one embodiment. The hardware 700 typically includes at least one processor 702 coupled to a memory 704. The processor 702 may represent one or more processors (e.g., microprocessors), and the memory 704 may represent random access memory (RAM) devices comprising a main storage of the hardware 700, as well as any supplemental levels of memory e.g., cache memories, non-volatile or back-up memories (e.g. programmable or flash memories), read-only memories, etc. In addition, the memory 704 may be considered to include memory storage physically located elsewhere in the hardware 700, e.g. any cache memory in the processor 702, as well as any storage capacity used as a virtual memory, e.g., as stored on a mass storage device 710.

The hardware 700 also typically receives a number of inputs and outputs for communicating information externally. For interface with a user or operator, the hardware 700 may include one or more user input devices 706 (e.g., a keyboard, a mouse, etc.) and a display 708 (e.g., a Cathode Ray Tube (CRT) monitor, a Liquid Crystal Display (LCD) panel).

For additional storage, the hardware 700 may also include one or more mass storage devices 710, e.g., a floppy or other removable disk drive, a hard disk drive, a Direct Access Storage Device (DASD), an optical drive (e.g. a Compact Disk (CD) drive, a Digital Versatile Disk (DVD) drive, etc.) and/or a tape drive, among others. Furthermore, the hardware 400 may include an interface with one or more networks 712 (e.g., a local area network (LAN), a wide area network (WAN), a wireless network, and/or the Internet among others) to permit the communication of information with other computers coupled to the networks. It should be appreciated that the hardware 700 typically includes suitable analog and/or digital interfaces between the processor 702 and each of the components 704, 706, 708 and 712 as is well known in the art.

The hardware 700 operates under the control of an operating system 714, and executes various computer software applications 716, components, programs, objects, modules, etc. (e.g. a program or module which performs operations described with reference to FIGS. 3 - 5 of the drawings). Moreover, various applications, components, programs, objects, etc. may also execute on one or more processors in another computer coupled to the hardware 700 via a network 712, e.g. in a distributed computing environment, whereby the processing required to implement the functions of a computer program may be allocated to multiple computers over a network.

In general, the routines executed to implement the embodiments of the invention, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processors in a computer, cause the computer to perform operations necessary to execute elements involving the various aspects of the invention. Moreover, while the invention has been described in the context of fully functioning computers and computer systems, those skilled in the art will appreciate that the various embodiments of the invention are capable of being distributed as a program product in a variety of forms, and that the invention applies equally regardless of the particular type of machine or computer-readable media used to actually effect the distribution. Examples of computer-readable media include but are not limited to recordable type media such as volatile and non-volatile memory devices, floppy and other removable disks, hard disk drives, and optical disks (e.g., Compact Disk Read-Only Memory (CD ROMS), Digital Versatile Disks, (DVDs), etc.).

Although the present invention has been described with reference to specific exemplary embodiments, it will be evident that the various modification and changes can be made to these embodiments without departing from the broader spirit of the invention as set forth in the claims. Accordingly, the specification and drawings are to be regarded in an illustrative sense rather than in a restrictive sense.

What is claim is:

1. A method implemented by a computer to filter an electronic publication published by a content publisher, the method comprising:
    registering an electronic publication received from a content publisher, wherein registering includes:
        assigning to the electronic publication a unique address to which the content publisher is to deliver additional content associated with the electronic publication,
        assigning a publication identification (ID) to the electronic publication, and
        registering content of the electronic publication by computing a signature for the content and associating the signature with the electronic publication via the publication ID;
    receiving a request from a client to determine whether additional content is registered, wherein the request includes an additional signature corresponding to the additional content;
    determining that the additional content is registered by using the additional signature as a key to search for a match via the publication ID; and
    providing the client with the publication ID in response to a match, wherein the publication ID allows the client to associate the additional content with the electronic publication as an additional electronic publication, wherein the publication ID facilitates automatic movement of the additional electronic publication into a client inbox when the additional electronic publication is on a subscribed list, and the publication ID facilitates automatic diversion of the additional electronic publication into a spam folder when the additional electronic publication is on an unsubscribed list.

2. The method as set forth in claim 1, wherein the content publisher is remote from the client.

3. The method as set forth in claim 1, wherein the registering of the electronic publication includes associating a publication name with the publication ID.

4. The method as set forth in claim 1, wherein the registering of the content includes accessing the content at a randomly selected unique address; computing a signature of the content that includes data representative of the content; and storing the signature in a database with the publication ID.

5. The method as set forth in claim 1, wherein the electronic publication includes a mass email publication.

6. A method implemented by a computer to manage mass electronic publication delivery, the method comprising:
    registering an electronic publication from a content publisher, wherein registering includes:
        assigning to the electronic publication a unique address to which the content publisher is to deliver additional content associated with the electronic publication,
        assigning a publication identification (ID) to electronic publication, and
        registering content of the electronic publication by computing a signature for the content and associating the signature with the electronic publication via the publication ID;
    receiving a request from a client to determine whether additional content is registered, wherein the request includes an additional signature corresponding to the additional content;
    determining that the additional content is registered by using the additional signature as a key to search for a match via the publication ID;
    providing the client with the publication ID in response to a match, wherein the publication ID allows the client to associate the additional content with the electronic publication as an additional electronic publication, wherein the publication ID facilitates automatic movement of the additional electronic publication into a client inbox when the additional electronic publication is on a subscribed list, and the publication ID facilitates automatic diversion of the additional electronic publication into a spam folder when the additional electronic publication is on an unsubscribed list.

7. The method as set forth in claim 6, further comprising: receiving input related to the content from a plurality of separate clients; and rating the content based on the input, wherein the rating provides an indication of whether the content is spam.

8. The method as set forth in claim 7, further comprising sending the rating to a further client to determine a default characterization of the content by the further client.

* * * * *